United States Patent
Ikits (10) Patent No.: US 9,652,885 B2
(45) Date of Patent: May 16, 2017

(54) METHOD AND SYSTEM FOR X-RAY IMAGE GENERATION

(71) Applicant: MAKO Surgical Corp., Ft. Lauderdale, FL (US)

(72) Inventor: Milan Ikits, Plantation, FL (US)

(73) Assignee: MAKO Surgical Corp., Ft. Lauderdale, FL (US)

( * ) Notice: Subject to any disclaimer, the term of this patent is extended or adjusted under 35 U.S.C. 154(b) by 0 days.

(21) Appl. No.: 15/257,622

(22) Filed: Sep. 6, 2016

(65) Prior Publication Data

US 2016/0371877 A1   Dec. 22, 2016

Related U.S. Application Data

(62) Division of application No. 13/948,592, filed on Jul. 23, 2013, now Pat. No. 9,443,346.

(51) Int. Cl.
| | |
|---|---|
| *G06K 9/00* | (2006.01) |
| *G06T 15/08* | (2011.01) |
| *G06T 19/20* | (2011.01) |
| *G09B 23/28* | (2006.01) |

(52) U.S. Cl.
CPC .............. *G06T 15/08* (2013.01); *G06T 19/20* (2013.01); *G09B 23/286* (2013.01); *G06T 2210/41* (2013.01); *G06T 2219/2016* (2013.01)

(58) Field of Classification Search
CPC ....... G09B 23/286; G06T 19/20; G06T 15/08; G06T 2210/41; G06T 2219/2016
See application file for complete search history.

(56) References Cited

U.S. PATENT DOCUMENTS

| | | | |
|---|---|---|---|
| 7,154,985 B2 | 12/2006 | Dobbs et al. | |
| 7,366,278 B2 | 4/2008 | Fu et al. | |
| 7,970,237 B2 | 6/2011 | Miller | |
| 8,241,041 B2 * | 8/2012 | Hostettler ................ | G06T 5/50 434/262 |

(Continued)

OTHER PUBLICATIONS

International Search Report and Written Opinion for PCT Application No. PCT/US2014/047649, mailed May 13, 2015, 9 pages.

(Continued)

*Primary Examiner* — Shefali Goradia
(74) *Attorney, Agent, or Firm* — Foley & Lardner LLP (57) ABSTRACT

A method for generating a virtual radiograph for display on a display device, including providing an image generation system having a processing circuit including a processor and a memory device, the image generation system coupled to the display device. The method further including retrieving three-dimensional image data of an anatomy stored in the memory and retrieving a three-dimensional bone model corresponding to a portion of the anatomy stored in the memory. The method further including associating the three-dimensional bone model with the three-dimensional image data such that the three-dimensional bone model defines first boundary containing a first bounded volume within the three-dimensional image data corresponding to the portion of the anatomy, and performing a volume ray casting process on the three-dimensional image data.

10 Claims, 9 Drawing Sheets

(56) References Cited

U.S. PATENT DOCUMENTS

2009/0017430 A1    1/2009  Muller-Daniels et al.
2013/0329982 A1*  12/2013  Alghamdi ............ G06F 19/3437
                                                          382/132

OTHER PUBLICATIONS

Manivannan Muniyandi et al., Real-Time PC based X-ray Simulation for Interventional Radiology Training, Medicine Meets Virtual Reality 11, IOS Press, 2003, 7 pages.

* cited by examiner

METHOD AND SYSTEM FOR X-RAY IMAGE GENERATION

CROSS REFERENCE TO RELATED APPLICATIONS

This application is a divisional of U.S. application Ser. No. 13/948,592, filed Jul. 23, 2013, which is incorporated herein by reference in its entirety.

BACKGROUND

The present disclosure generally relates to the field of x-ray visualization. The present disclosure relates more specifically to the creation of two-dimensional x-ray images for providing assistive views in preparation for an operation.

Medical professionals may be accustomed to using traditional x-ray images in surgical planning methods, and accordingly, it is desirable to provide improvements for surgical planning and anatomy visualization that utilize the same types of images that medical professionals are comfortable with. At the same time, there are limitations to using traditional x-ray models, such as the inability to correct the position of the patient's anatomy in the anatomy image. In surgical planning, it may be desirable to have the target anatomy in a particular position, but an x-ray image is limited to the position of the patient on the x-ray table when the image is created. Furthermore, traditional x-ray images cannot be manipulated to show rotated/repositioned anatomy or implants, such as orthopedic joint prostheses, in an x-ray image to provide a guide for surgical planning and for comparison with a post-operative record.

SUMMARY

One implementation of the present disclosure relates to a method of creating an image. The method includes providing three-dimensional image data of an anatomy, providing a model of a portion of the anatomy, and creating a virtual radiograph of a target portion of the anatomy using information from the image data and information from the model.

In some embodiments, the method may include representing a portion of the anatomy in a modified state on the virtual radiograph, and the modified state may be a translation or rotation, or a resection, of the portion of the anatomy. The portion of the anatomy may be modified according to a preoperative plan.

In some embodiments, the method may include subtracting image data corresponding to the portion of the anatomy from the virtual radiograph. The virtual radiograph may further be created by modifying image data corresponding to the portion of the anatomy and adding the modified image data to the virtual radiograph.

In some embodiments, the method may include adding an image of a prosthetic device to the virtual radiograph. The image of the prosthetic device may be added to the virtual radiograph according to a preoperative plan.

In some embodiments, the model of a portion of the anatomy is a segmented bone model. In other embodiments, the model may provide a boundary of the portion of the anatomy within the three-dimensional image data.

In some embodiments, creating the virtual radiograph may include executing a first volume ray casting process on the three-dimensional image data, and may include executing a second volume ray casting process on the three-dimensional image data bounded by the model. The creating the virtual radiograph may include calculating first set of accumulated attenuation values during the first volume ray casting process, adding the first set of accumulated attenuation values to the virtual radiograph, calculating a second set of accumulated attenuation values during the second volume ray casting process, and subtracting the second set of accumulated attenuation values from the virtual radiograph. The creating the virtual radiograph may further include modifying the second set of accumulated attenuation values according to a preoperative plan and adding the modified second set of accumulated attenuation values to the virtual radiograph, and wherein the step of creating a virtual radiograph includes adding an image of a prosthetic device to the virtual radiograph.

In some embodiments, creating the virtual radiograph may include performing a third volume ray casting process on an implant model, calculating a third set of accumulated attenuation values from the third volume ray casting process, and adding the third set of accumulated attenuation values to the difference of the first and second sets of accumulated attenuation values. The method may further include wherein the implant model is positioned and oriented relative to the three-dimensional image data, the model, or the portion of the anatomy according to a preoperative plan.

Another implementation of the present disclosure is an image generation system including a processing circuit having a processor and a memory, an input/output interface, a display coupled to the input/output interface. The processing circuit is configured to retrieve three-dimensional image data of an anatomy, retrieve a model of an anatomy corresponding to a portion of the anatomy, create a virtual radiograph using information from the three-dimensional image data and the model, and display the resultant virtual radiograph on the display.

In other embodiments, the processing circuit is further configured to modify the portion of the anatomy according to a preoperative plan. The processing circuit may be further configured to display, in the virtual radiograph, the portion of the anatomy in a modified state.

In other embodiments, the processing circuit is further configured to subtract image data corresponding to the portion of the anatomy from the virtual radiograph, and may be configured to modify the image data corresponding to the portion of the anatomy, and may be further configured to add the modified image data corresponding to the portion of the anatomy to the virtual radiograph. The processing circuit may be configured to modify the image data corresponding to the portion of the anatomy according to a preoperative plan.

In other embodiments, the processing circuit is further configured to add a virtual image of a prosthetic device to the virtual radiograph.

Another implementation of the present disclosure is a method for generating a virtual radiograph for display on a display device. The method includes providing an image generation system having a processing circuit including a processor and a memory device, the image generation system coupled to the display device, retrieving three-dimensional image data of an anatomy stored in the memory, retrieving a three-dimensional bone model corresponding to a portion of the anatomy stored in the memory, associating the three-dimensional bone model with the three-dimensional image data such that the three-dimensional bone model defines first boundary containing a first bounded volume within the three-dimensional image data corresponding to the portion of the anatomy, and performing a volume ray casting process on the three-dimensional image data. The volume ray casting process includes casting a ray from an origin point through a first pixel in a screen space rectangle, and through the first bounded volume, sampling the first bounded volume at a plurality of sampling steps along the ray, the sampling steps separated by a sampling distance, wherein the sampling is limited to a segment of the ray between a position proximate to a front facing intersection of the ray and the first boundary, and a position proximate to a back facing intersection of the ray and the first boundary, computing an attenuation coefficient of the ray at each of the sampling steps based upon the sample at each of the sampling steps, calculating a first accumulated attenuation value of the first bounded volume along the ray, casting a second ray along a second pixel of the screen space rectangle, repeating the sampling, computing, and calculating steps for the second pixel of the screen space rectangle to calculate a second accumulated attenuation value of the first bounded volume, and storing the accumulated attenuation values of the first bounded volume.

In other embodiments, the method further includes providing a second boundary defining a second bounded volume of the three-dimensional image data, performing the volume ray casting process on the second bounded volume of the three-dimensional image data, adding the accumulated attenuation values of the second bounded volume to the virtual radiograph, and subtracting the accumulated attenuation values of the first bounded volume from the virtual radiograph.

In other embodiments, the method further includes modifying data associated with the first bounded volume. The data associated with the first bounded volume may include at least one of three-dimensional image data within the first bounded volume, the attenuation coefficients of the first bounded volume, the accumulated attenuation values of the first bounded volume, and color information associated with the first bounded volume.

In other embodiments, the modification of data associated with the first bounded volume includes at least one of translation, rotation, and resection. The modification of data may also be performed to correspond to a preoperative plan. The data associated with the first bounded volume may be the accumulated attenuation values of the first bounded volume, and further comprising adding the modified accumulated attenuation values of the first bounded volume to the virtual radiograph.

In other embodiments, the method may include calculating attenuation values of an implant model and adding the attenuation values of the implant model to the virtual radiograph. The implant model may be positioned relative to the three dimensional image data according to a preoperative plan.

In other embodiments, the method may further include converting the accumulated attenuation values of the first bounded volume to color information and providing the color information to the display.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for creation of two-dimensional (2-D) x-ray images are shown and described. The systems and methods described herein may generally create interactive high-quality virtual radiographs, also referred to herein as x-ray images, using a patient computed tomography (CT) scan, segmented bone models, and a preoperative plan for an operation. The x-ray images generated may provide a full antero-posterior view for implant planning (or any other surgical planning). The generated x-ray images may further be used as a comparison with a post-operative record. The images are displayed on a user interface augmented with digital tools that may assist a user during a pre-operative surgical planning process.

In one embodiment, the systems and methods herein may be used to provide a customizable view of the pelvis and femur of a patient. For example, an x-ray image of the pelvis and the femur may be created, then may be manipulated in such a way to provide a pure antero-posterior or lateral perspective of the anatomy. This may provide an improvement on traditional x-ray imaging techniques in that a limitation of traditional x-ray imaging techniques relates to the effect of a patient's position on the x-ray table. Further, implant models may be added to the x-ray image to be utilized in preparation of the surgical plan and to be used for comparison with a post-operative record.

Figure 1:
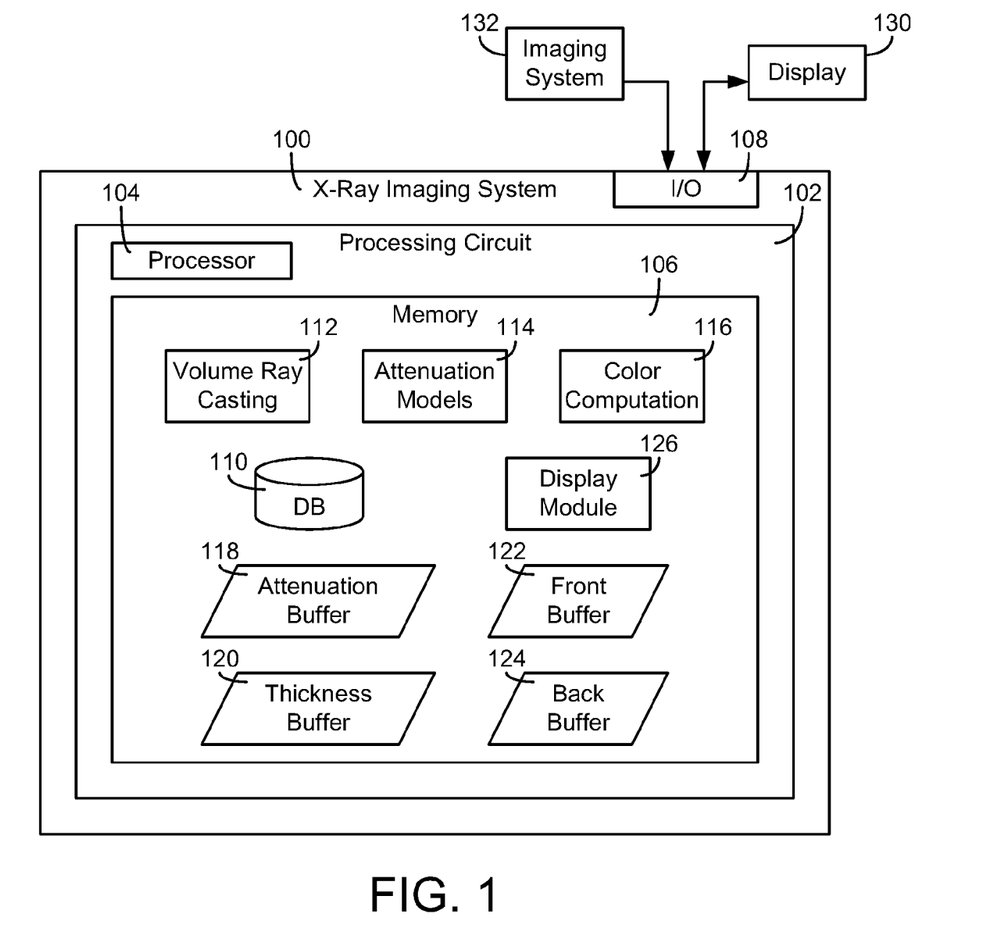
FIG. 1 is a block diagram of an image generation system, according to an exemplary embodiment.
Figure 2:
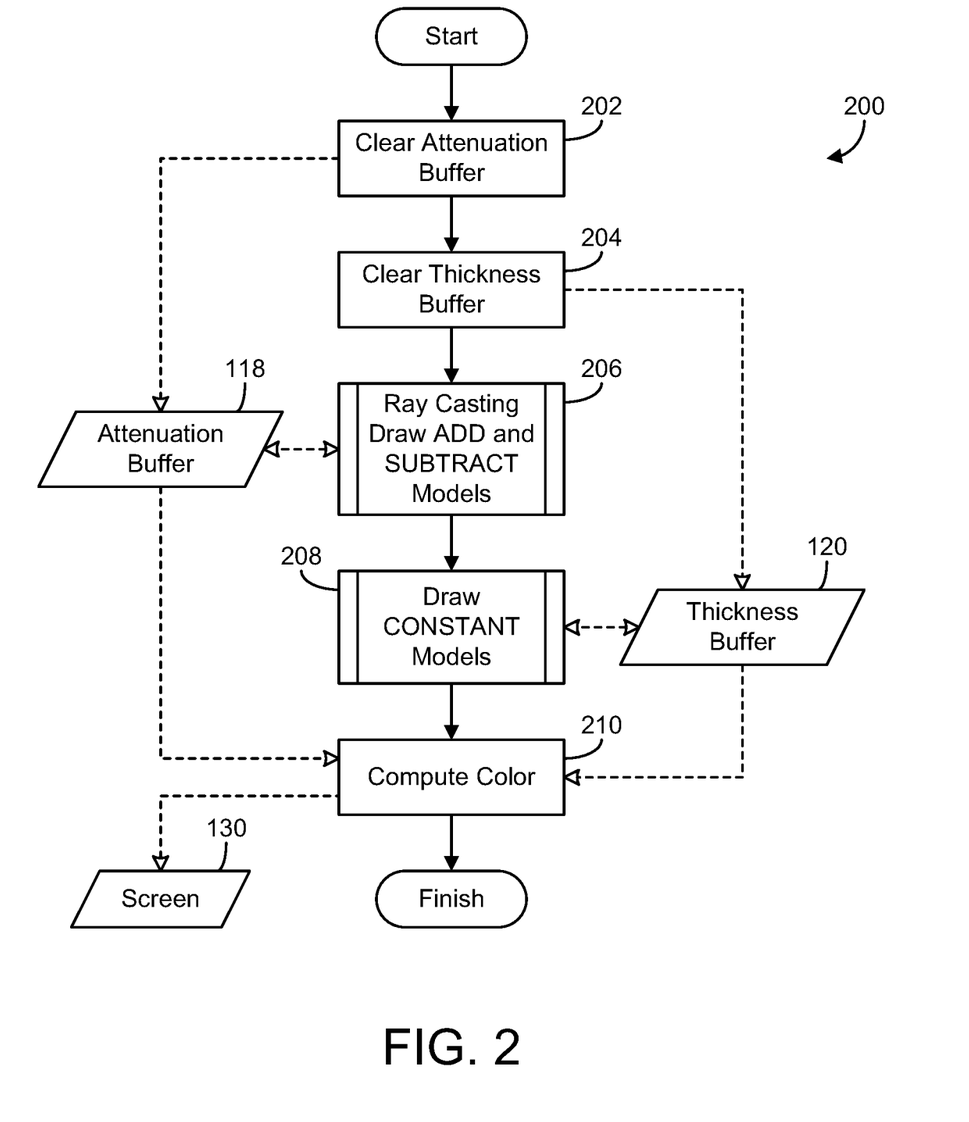
FIG. 2 is a flow chart of an x-ray visualization process, according to an exemplary embodiment.

The x-ray images are manipulated to provide various views for preparation in an operation. Referring generally to FIGS. 1-2, an image generation system 100 and a process 200 executable by image generation system 100 are shown and described. Image generation system 100 may generally be configured to generate x-ray images for viewing by a medical professional. Image generation system 100 may be a component integrated with other medical-related software, according to one embodiment.

System 100 may generate x-ray images using data representing the anatomy of a patient, such as a patient CT scan from an imaging system 132 or a statistical deformable model, segmented bone models, and a preoperative plan for an operation. In one example of a preoperative plan a doctor and/or assistants to a doctor may map out anticipated tissue resections, implant placements, and/or other intended actions to be performed during or outcomes to be realized from the surgery. System 100 may receive such information from a user via an input/output (I/O) interface 108, and/or retrieve the information from a database 110. Segmented bone models may be created by such methods as a livewire segmentation technique, Mimics software, or other methods known in the art.

System 100 generally includes a processing circuit 102 having a processor 104 and memory 106. Processor 104 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 104 is configured to execute computer code stored in memory 106 to complete and facilitate the activities described herein. Memory 106 can be any volatile or non-volatile memory device capable of storing data or computer code relating to the activities described herein. For example, memory 106 is shown to include various modules which are computer code modules (e.g., executable code, object code, source code, script code, machine code, etc.) configured for execution by processor 104. When executed by processor 104, processing circuit 102 is configured to complete the activities described herein.

Memory 106 is shown to include various modules for executing process 200. Process 200 for generating an x-ray image may generally include a volume ray casting component where additive and subtractive models are drawn, a component for drawing constant attenuation models, and a component for computing the output color from the attenuation and thickness values computed by the first two components. Memory 106 is shown to include a volume ray casting module 112, an attenuation model module 114, and a color module 116 for executing the components of process 200. Ray casting module 112 may generally be configured to rotate or resect one or more features in a provided CT scan image. Attenuation model module 114 may generally be configured to indicate such a feature in an x-ray image output by system 100, and color module 116 may be configured to provide grayscale color settings for the image for display. The activities of modules 112-116 are described in greater detail below with respect to subsequent figures.

Memory 106 may include one or more buffers 118-124 for temporarily storing data during the x-ray image generation process. Memory 106 includes an attenuation buffer 118 for storing additive and subtractive attenuation values computed during the ray casting process. Memory 106 also includes a thickness buffer 120 for storing a thickness of input models and a front buffer 122 and back buffer 124 to store XYZ coordinates of the front and back fragments of an input model. The use of buffers 118-124 are described in greater detail below with respect to subsequent figures.

Memory 106 further includes a display module 126. Display module 126 may be configured to generate a display for a user including the generated x-ray image. Display module 126 may further be configured to generate a user interface for display on a display 130 that allows a user to interact with the x-ray image, as described with reference to FIGS. 8-9.

System 100 further includes an input/output (I/O) interface 108. I/O interface 108 may be configured to receive information from an imaging system 132, and to receive information from and transmit information to an external display 130. I/O interface 108 may be configured to transmit one or more x-ray images for display on display 130, either wirelessly or via a wired connection. Display 130 may be any type of display, such as a display for a computer or other device. An example of an x-ray image that may be displayed via display 130 is shown in greater detail in FIG. 9. I/O interface 108 may further receive inputs via display 130, an input device (e.g., keyboard, mouse, touch on a touchscreen, etc.) associated with display 130, other peripheral devices, and/or other systems contained within a broader surgical system platform. System 100 and more particularly the modules of system 100 may be configured to interpret the inputs and generate x-ray images based on the inputs.

Referring again to FIG. 2, a flow chart of the high-level x-ray visualization process 200 for generating an x-ray image is shown. Process 200 may generally be configured to create an x-ray image based on a patient's CT scan, segmented bone models, created by any means known in the art, and a preoperative plan.

Figure 3A:
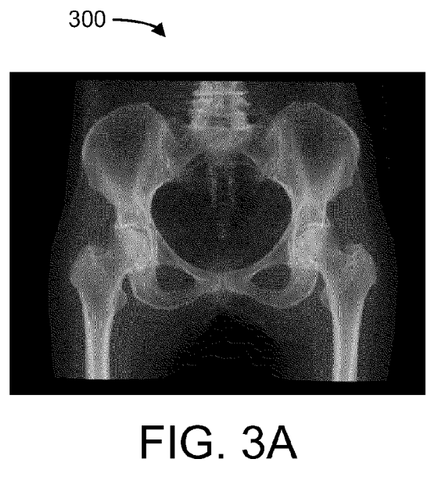
FIGS. 3A-D illustrate the x-ray visualization process of FIG. 2, according to an exemplary embodiment.

Process 200 may generally include, after clearing attenuation buffer 118 and thickness buffer 120 (steps 202, 204), a volume ray casting process 206. Ray casting process 206 may be executed by, for example, volume ray casting module 112. Ray casting process 206 may generally include creating an x-ray image from a CT scan by casting a ray from an origin point 608 through the bounding box of the CT volume for each pixel in the image from the CT scan. The attenuation computed from the CT values along the rays is accumulated. An x-ray image created by the volume ray casting process 206 is illustrated in image 300 of FIG. 3A. Image 300 is an x-ray view of the CT scan before any manipulation of the image has occurred.

Ray casting process 206 may also generally include, using the same viewing parameters, creating an image of the CT volume inside certain of the segmented bone models selected for manipulation, for example both femur bones, as in an exemplary embodiment. The accumulated attenuation values may then be subtracted from the previous computed attenuation, to assist with surgical planning and any necessary manipulation of the anatomy shown in the x-ray image. Referring to image 310 of FIG. 3B, the x-ray image illustrated shows the result of subtracting the accumulated attenuation values. For example, for a segmented femur bone model, the femur bones are shown "subtracted" from the x-ray image.

In order to obtain an x-ray image of the patient's anatomy in a desired position, ray casting process 206 may also generally include creating an image of the CT volume inside bone models that have been translated, rotated, resected, and/or otherwise modified. In one embodiment these modifications are made according to a preoperative plan. The accumulated attenuation values may then be added to the previous computed attenuation in the desired position. Referring also to image 320 of FIG. 3C, the x-ray image illustrated shows the result of adding the accumulated attenuation values. For the femur bone example illustrated in the figures, the virtually modified femur bones are added back into the x-ray image. In the illustrated embodiment, the mechanical axes, which may be defined relative to the segmented bone model, are aligned to the pelvic midline axis and the operative side femur bone model is resected and reduced based on a preoperative plan.

After ray casting process 206, process 200 includes an attenuation model process 208 in which attenuation models are drawn. Process 208 may generally include creating an image of the implant models, where the attenuation is proportional to the aggregate view-dependent thickness of the models and the implant model is placed according to a preoperative plan. The generated attenuation values are added to the attenuation computed in process 206. Referring to image 330 of FIG. 3D, the x-ray image illustrated shows the result of process 208. Processes 206, 208 will be described in greater detail below with reference to FIGS. 4 and 7, respectively.

Process 200 further includes mapping the computed attenuation values to grayscale color (step 210) and providing the x-ray image with the color information to a screen or other display 130. Step 210 utilizes data in attenuation buffer 118 generated during ray casting process 206 and data in thickness buffer 120 generated during attenuation model process 208.

Figure 3B:
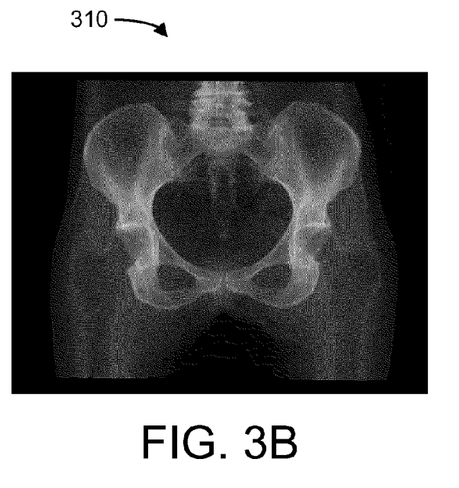
Figure 3C:
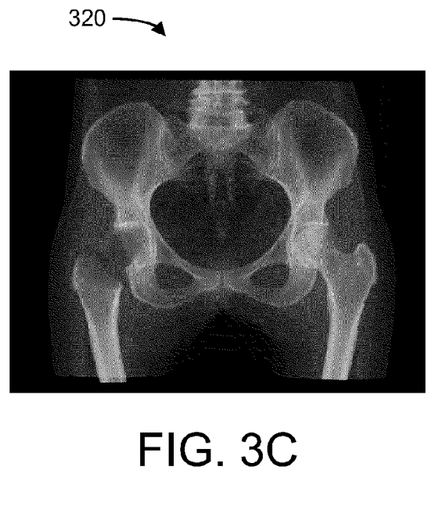
Figure 3D:
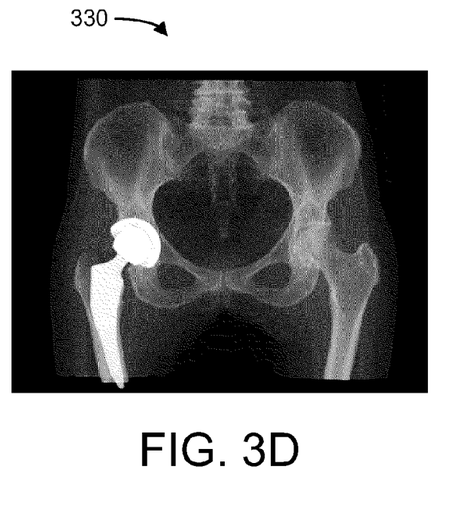

By executing process 200, x-ray images, such as those shown in images 310, 320, and 330 of FIGS. 3B-3D, are generated that illustrate rotated or otherwise manipulated features (e.g., the femur bone in image 320), and/or the planned position of an implant model (e.g., the implant model in image 330). The features are shown in order to provide additional assistive views for a surgeon or other medical professional for preparation for surgery or for other medical reasons. The ray casting process may generally be configured to manipulate the features in the x-ray image, and the attenuation model process may generally be configured to illustrate such changes and features relevant to the procedure.

Figure 4:
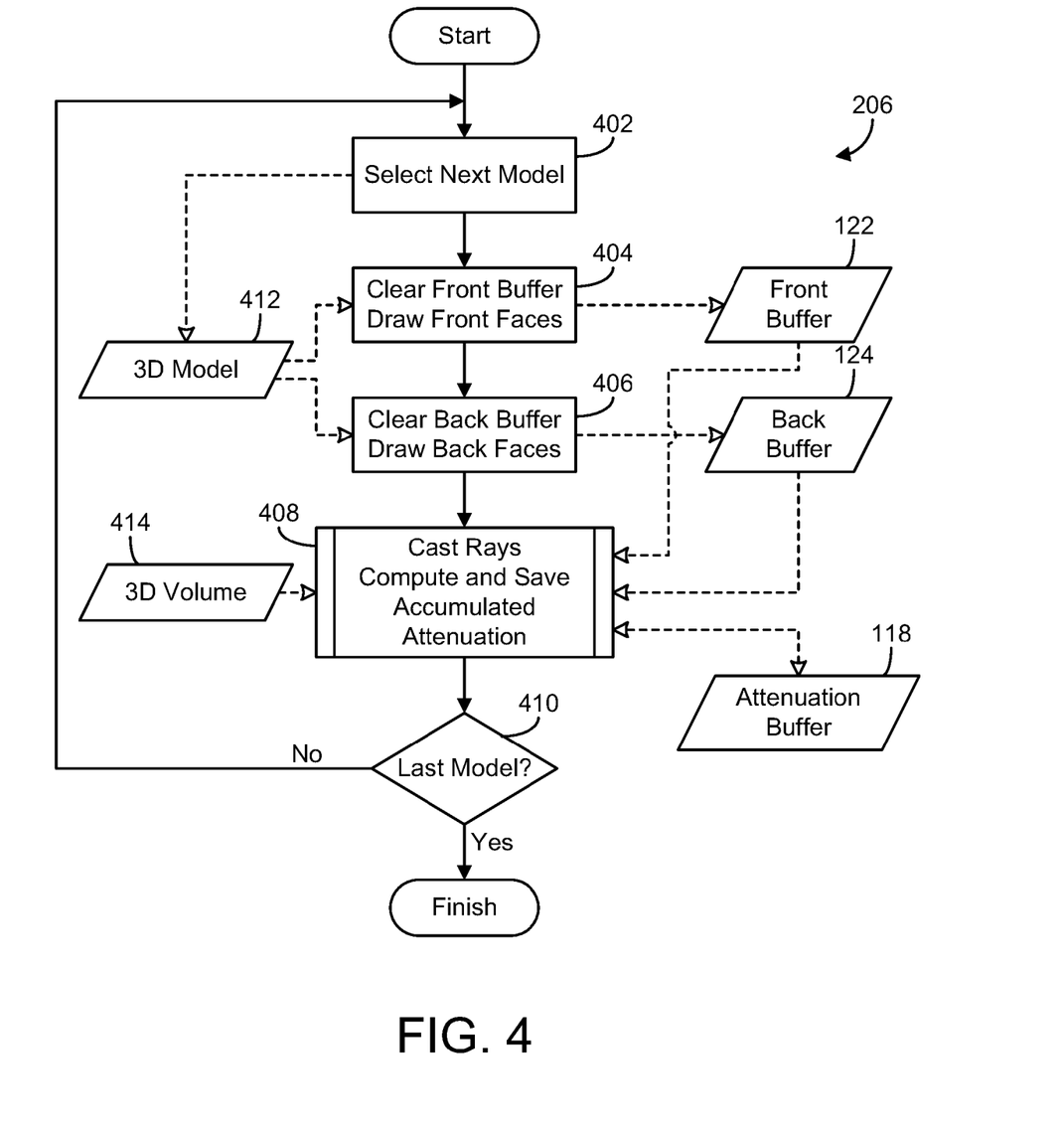
FIG. 4 is a flow chart of the ray casting process of the x-ray visualization process of FIG. 2, according to an exemplary embodiment.

Referring now to FIG. 4, ray casting process 206 is described in greater detail. Ray casting process 206 may be executed for an entire CT volume, and for a number of segmented bone models to be used to modify the initial x-ray image. After selecting the next model (step 402), which may be, for example, an entire CT volume bounded by a cube or a segmented bone model, process 206 includes executing three rendering passes. First, the front faces of the model are drawn into front buffer 122 (step 404). This stores the world space coordinates of the front facing intersections 610 of the model surface and each ray 606 used in step 408, as discussed below. Also, the back faces of the model are drawn into back buffer 124 (step 406). This stores the world space coordinates of the back facing intersections 612 of the model surface and each ray 606 used in step 408. Also, a screen space rectangle 602 (as illustrated in FIG. 6) may be drawn to execute the GLSL shader for the ray casting algorithm.

Ray casting process 206 further includes ray casting, and computing and saving an accumulated attenuation resulting from the ray casting (process 408). Process 408 is described in greater detail in FIG. 5. The resulting accumulated attenuation is stored in attenuation buffer 118, and process 206 moves on to check if there are more models to process (step 410).

Figure 5:
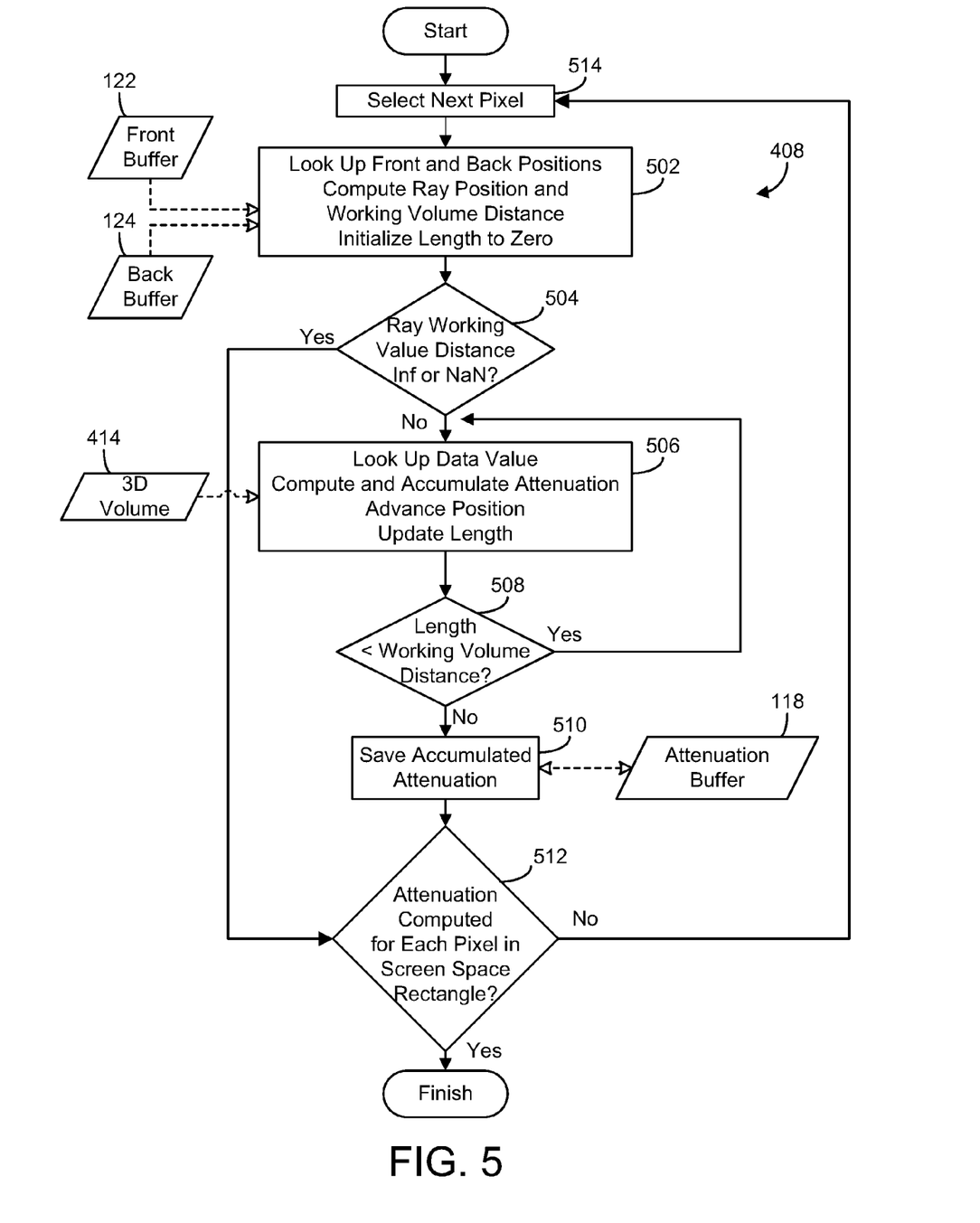
FIG. 5 is a flow chart of a process for computing an accumulated attenuation for the ray casting process of FIG. 2, according to an exemplary embodiment.

Referring to FIG. 5, process 408 of computing and saving an accumulated attenuation first includes initializing various parameters, such as ray position, direction, and working volume distance (step 502). Step 502 may include looking up the world space coordinates of the front and back facing intersections 610, 612 of the model from buffers 122, 124. The ray position (e.g., a starting point of the ray 606), direction of the ray, and the working volume distance of the ray is computed, and a separate length variable is initialized to zero. The working volume distance for each ray 606 may be computed as the distance along the ray 606 between the front facing intersection 610 and the back facing intersection 612. Process 408 further includes checking if the working volume distance is not a valid number (e.g., infinity, not a number (NaN) or some other invalid value) (step 504).

Figure 6A:
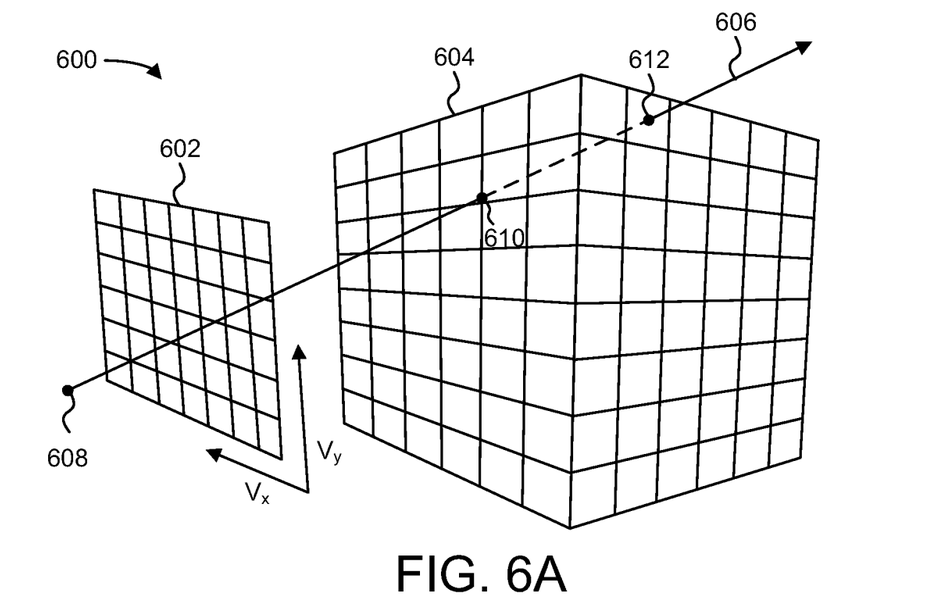
FIGS. 6A-B illustrate the ray casting algorithm of FIG. 5, according to an exemplary embodiment.
Figure 6B:
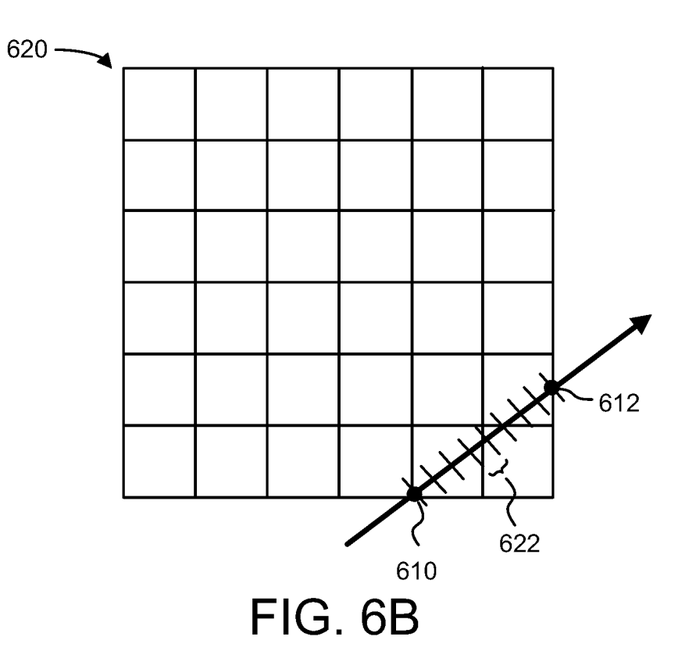

Process 408 further includes looking up a data value and computing and accumulating the attenuation (step 506). The activities of step 506 are illustrated in FIGS. 6A-B. FIG. 6A is an illustration 600 of an example screen space rectangle 602 and volume 604 for a model, and FIG. 6B is an illustration 620 of a top-down view of ray 606 going through volume 604. Step 506 first includes retrieving the 3D model from buffer 414 where the model is stored. To obtain the data value, a ray 606 with a specified ray position and direction is sent from an origin point 608. Each ray 606 is sent from the origin point 608, through the center of a respective pixel in screen space rectangle 602, then through the bounding box of the volume 604. In one embodiment, a ray 606 may be computed for each pixel in the screen space rectangle 602. In another embodiment, multiple rays 606 may be computed for each pixel in the screen space rectangle 602, and the attenuation or color of the pixel is computed as the average of the attenuation or color from the multiple rays associated with each respective pixel. The ray caster moves along ray 606 at the given sampling distance 622 from the front facing side of the volume to the back facing side of the volume. Sampling distance 622 should be selected to provide acceptable visualization, for example, choosing a sampling distance that is too coarse may result in the appearance of artifacts and spaces due to the difficulty of blending between one sample and the next. The first sample may be taken at the front facing intersection 610. At each step (e.g., at each sampling distance 622), the ray caster samples the volume to obtain an interpolated CT value. The CT value is converted to an attenuation coefficient (described below with respect to the transfer function and more specifically equations (18) and (19)). The CT value is accumulated for each sampling distance. The accumulated CT values may be represented as accumulated attenuation (A):

$$A = \Sigma \mu(p_k) d \quad (1)$$

where $\mu(p_k)$ is the attenuation coefficient computed from the CT value $v(p_k)$ at a sampling location $(p_k)$ along ray 606 and d is the step length (e.g., sampling distance 622).

After each step the position of ray 606 is updated (for advancing ray 606 through the volume of volume 604). The length variable is increased by sampling distance 622 as well. If the length variable is not greater than the computed working volume distance (step 508), then process 408 includes returning to step 506 for advancing the sampling position along the ray in volume 604. Once the length variable is greater than the computed working volume distance, the accumulated attenuation may be saved in attenuation buffer 118 (step 510). If attenuation has been calculated, or an NaN or infinity determination has been made, for each pixel in the screen space rectangle 602 process 408 may terminate, otherwise the process may continue for each remaining pixel in the screen space rectangle 602. In one embodiment process 408 may be executed for each pixel in parallel by processor 104. The result of process 408 is an accumulated attenuation stored in attenuation buffer 118 for each pixel in the screen space rectangle 602 that is to be used in generating the X-ray image for display. Attenuation buffer 118 is generally configured to store additive and subtractive accumulated attenuation values as described below.

The volume ray casting process of step 506 supports arbitrary bounding models such as closed oriented manifold surfaces. For example, to generate an X-ray view of a femur only, the segmented femur model may be used as the bounding box for the ray casting component. An arbitrary number of bounding models may be added to the visualization. The accumulated attenuation from each bounding model is either added or subtracted from the total attenuation, depending on the type of model. Subtracting the accumulated attenuation is used to mask the contribution of a given bone in the X-ray image (as shown in FIG. 3B). Additive and subtractive models may be accumulated separately:

$$A^+ = \Sigma \mu^+(p_k)d \quad (2)$$

$$A^- = \Sigma \mu^-(p_k)d \quad (3)$$

The accumulated attenuation is converted to greyscale color (step 210):

$$c = 1 - \exp(-A) \quad (4)$$

The color calculation may be modified to handle subtractive models:

$$c = 1 - \exp(-A^+ + A^-) \quad (5)$$

Although Equation 5 includes a negative $A^+$ added to a positive $A^-$, as used herein this and similar operations are considered a subtraction of $A^-$ values from $A^+$ values, as this operation is performed within a negative exponential function. In a similar manner, this and similar operations could also be considered an addition, as used herein, of $A^+$ values to $A^-$ values. The result being that $A^+$ values tend to increase the brightness of their respective pixels, while $A^-$ values tend to decrease the brightness of their respective pixels. In an alternative embodiment in which it may be desirable for more radiodense volumes to appear darker, and less radiodense volumes to appear lighter, the signs in front of $A^+$ and $A^-$ may be interchanged without altering the nature of addition and subtraction operations as used herein. The calculated color (c) may then be utilized to display a grayscale image. For example, in an 8-bit RGB display, the calculated color (c) may be utilized to calculate Red, Green, and Blue values according to:

$$\text{Red} = 255c \quad (6)$$

$$\text{Green} = 255c \quad (7)$$

$$\text{Blue} = 255c \quad (8)$$

As mentioned above, the CT value $v(p_k)$ may be converted to an attenuation coefficient value $\mu(p_k)$ via a transfer function. Attenuation of X-ray intensity through homogenous materials is characterized by the Beer-Lambert law:

$$I = I_0 \exp(-\mu \Delta x) \quad (9)$$

$I_0$ is the incoming intensity, I is the outgoing intensity, $\mu$ is the linear attenuation coefficient representing the radiodensity of the material, and $\Delta x$ is the distance the X-ray beam travels in the material. For inhomogeneous media, the equation may be approximated by a discrete summation, according to the following equation:

$$I = I_0 \exp(-\Sigma \mu_k \Delta x) \quad (10)$$

Each line segment is assumed to be the same length crossing homogeneous material with a constant attenuation coefficient $\mu_k$.

In radiology the Hounsfield scale is used as a standardized way of characterizing the radiodensity of materials. The relationship between the Hounsfield unit (HU) and the linear attenuation coefficient is expressed by the following equation:

$$HU = 1000 * (\mu - \mu_0)/\mu_0 \quad (11)$$

where $\mu_0$ is the linear attenuation coefficient of water. Attenuation is a function of incident X-ray photon energy. For example, for a 100 keV X-ray beam, $\mu_0 = 0.17$ cm$^{-1}$, which means that 1 cm of water attenuates $1 - e^{-0.17} = 15.6\%$ of the photons in the beam. Under the same conditions, if an attenuation coefficient in a bone is given as $\mu = 0.3$ cm$^{-1}$, this results in an HU value of 765. In general, the HU value for bone ranges from 700 for cancellous to 3000 for a cortical bone.

CT values may be stored in DICOM (digital imaging and communications in medicine) files. The CT values (v) are related to the HU values as follows:

$$HU = v * \text{slope} + \text{intercept} \quad (12)$$

where the slope and intercept are parameters of the scanner and are stored in the data files. The slope and intercept values may differ based on various standards of different manufacturers.

The combination of equations (11) and (12) yields that the relative attenuation coefficient is a linear function of the CT values:

$$\mu/\mu_0 = \max(\alpha * v + \beta, 0) \quad (13)$$

where $\alpha = \text{slope}/1000$ and $\beta = \text{intercept}/1000 + 1$. Since the lower end of the CT data value range is either zero or negative, additional clamping is needed to ensure that the computed attenuation coefficient is a non-negative number.

A characteristic property of X-ray images is that tissue structures with higher X-ray attenuation appear brighter in the image. To highlight or suppress tissue structures in the generated X-ray visualization, the HU values are rescaled in a process called windowing:

$$HU' = \text{clamp}((HU - HU_0)/(HU_1 - HU_0), 0, 1) * (HU_{max} - HU_{min}) + HU_{min} \quad (14)$$

where $HU_0$ and $HU_1$ specify the window range and $HU_{min}$ and $HU_{max}$ are the minimum and maximum HU values from the data. Substituting equation (9) into equation (11) yields that windowing can be performed directly on the CT values:

$$v' = \text{clamp}((v - v_0)/(v_1 - v_0), 0, 1) * (v_{max} - v_{min}) + v_{min} \quad (15)$$

where $v_{min}$ and $v_{max}$ are the minimum and maximum CT values in the data.

Windowing rescales the CT value range, so tissues with CT values below $v_0$ are suppressed and tissues with CT values above $v_1$ are highlighted with a smooth transition for tissues with CT values between $v_0$ and $v_1$. Windowing allows the user to include only a selected CT value range in the visualization.

A user interface (see FIGS. 8A-D and 9) may include brightness and contrast sliders in an icon toolbar that control which tissue structures are highlighted in the generated X-ray image. The window for such structures is computed according to:

$$v_0 = v_{min} + (v_{max} - v_{min}) * k_0 \quad (16)$$

$$v_1 = v_{min} + (v_{max} - v_{min}) * k_1 \quad (17)$$

where:

$$k_1 = (1 - B) * 1.25 \quad (18)$$

$$k_0 = C * k_1 \quad (19)$$

and $0 \leq B, C \leq 1$ are the values of the brightness and contrast sliders.

To simplify the computations, equations (10) and (12) may be combined:

$$\mu = \max(\text{clamp}(v, v_0, v_1) * v_{scale} + v_{offset}, 0) \quad (20)$$

where:

$$v_{scale} = (v_{max} - v_{min})/(v_1 - v_0) * \alpha * \mu_0 \quad (21)$$

$$v_{offset} = v_{min} * \alpha * \mu_0 + \beta * \mu_0 - v_0 * v_{scale} \quad (22)$$

Equations (20), (21) and (22) are the equations that may be used to convert the CT values obtained in process 408 to attenuation values. The attenuation values are then accumulated as described with reference to equations (2) and (3).

The IGS (image guided system) files used may contain data values that are not identical to the original CT values from the scanner. During the DICOM to IGS conversion process, the original CT values are rescaled using the scale and offset parameters in the DICOM header resulting in standard HU values. Next, the HU values are modified using the windowing parameters in the DICOM header if the average HU value falls within the window. Otherwise, the data is shifted so the smallest HU value is mapped to zero in the output. This process may prevent recovery of the HU values, because it is not clear from the IGS header which conversion has been applied. To accommodate both conversions, both equations (21) and (22) are used with slope set to 1 and intercept set to −1000, resulting in $\alpha = 1/1000$ and $\beta = 0$. The max function in equation (20) is not necessary in such an implementation.

Figure 7:
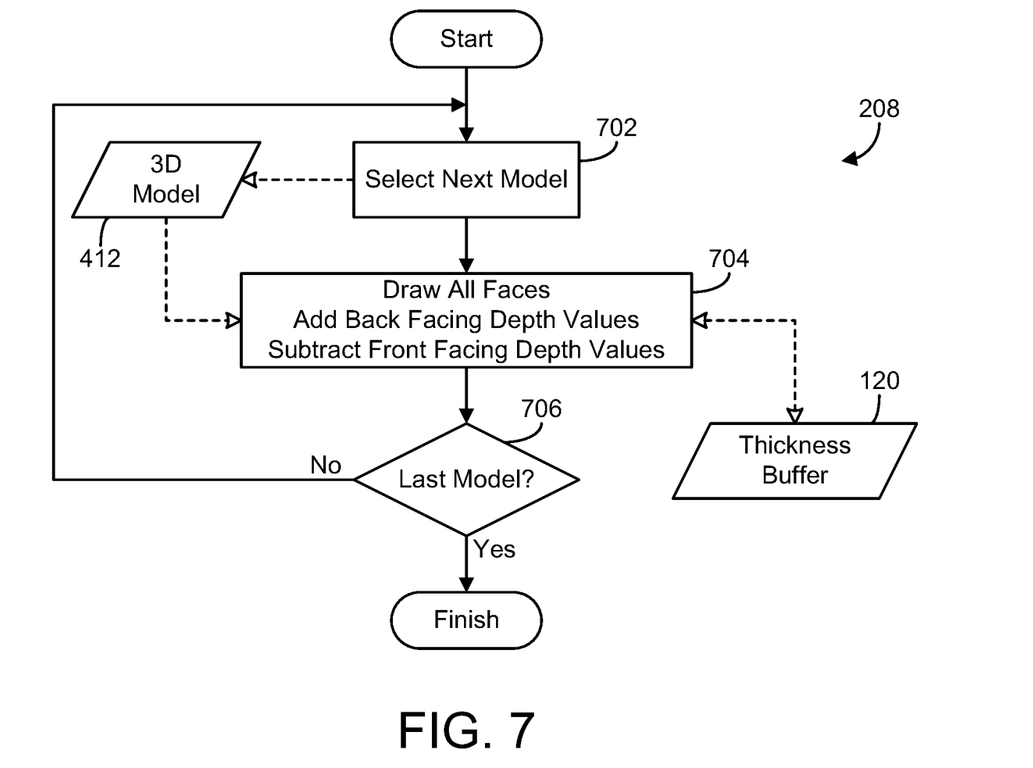
FIG. 7 is a flow chart of a process for drawing constant attenuation models for the x-ray visualization process of FIG. 4, according to an exemplary embodiment.
Figure 8A:
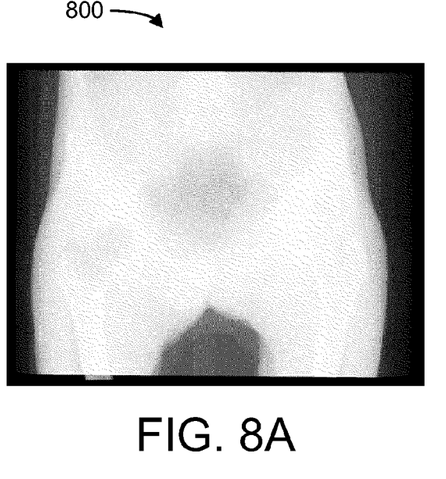
FIGS. 8A-D illustrate the effect of various brightness and contrast values that may be set for an x-ray image, according to an exemplary embodiment.
Figure 8B:
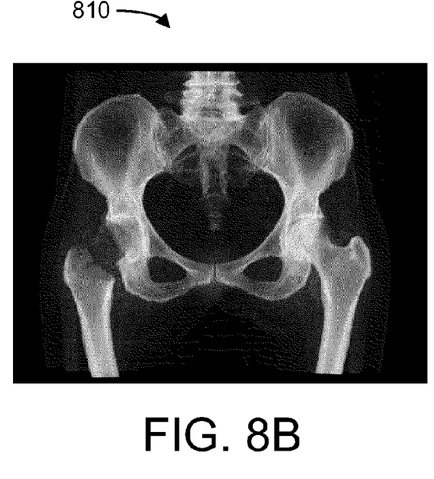
Figure 8C:
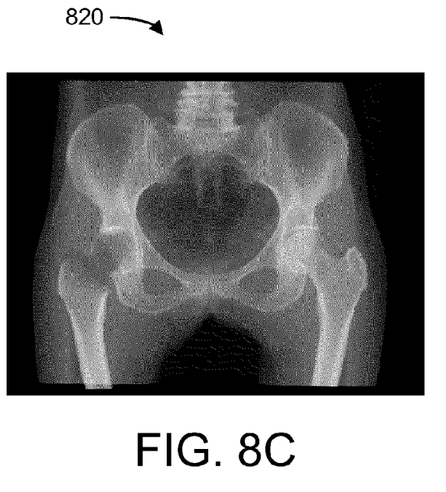
Figure 8D:
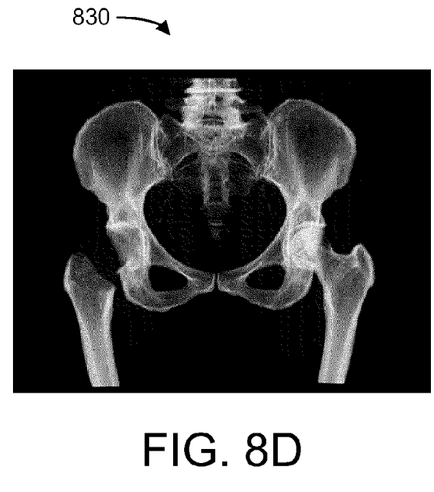

Referring to FIG. 7, process 208 for drawing constant attenuation models is described in greater detail. Process 208 may be executed after a ray casting process in which attenuation values are stored in attenuation buffer 118. Process 208 may be executed for a number of models to be used in the x-ray image generation process. After selecting the next model (step 702), all triangle faces of the model are drawn (step 704). The back facing depth values are subtracted from and the front facing depth values are added to the values in thickness buffer 120. After drawing the constant attenuation models in process 208, thickness buffer 120 contains the aggregate view dependent thickness of the constant attenuation models. Process 208 repeats for all models to be drawn, and terminates after the last model has been rendered (step 706).

Since implant components (that are part of a preoperative plan) are not part of the CT volume, the data may be added in a separate rendering pass. In one embodiment, for the sake of speed it is assumed that each component of the implant is made of the same material, a view-dependent thickness t may be computed for each implant component. The accumulated attenuation ($A^{imp}$) is then computed from the thickness:

$$A^{imp} = \mu * t \quad (23)$$

where $\mu$ is the linear attenuation coefficient of the implant material computed from the corresponding HU value as:

$$\mu/\mu_0 = HU/1000 + 1 \quad (24)$$

The color calculation of equation (5) may be modified to include the contribution from all implant components:

$$c = 1 - \exp(-A^+ + A^- - A^{imp}) \quad (25)$$

Contributions from the implant components are not affected by the brightness and contrast sliders, according to an exemplary embodiment.

Referring also to FIGS. 8A-D, the effect of the various brightness and contrast values for an x-ray image is illustrated. The user may adjust the brightness and contrast sliders on a user interface (FIG. 9) to fine tune the look of the X-ray image and account for the differences in data between various scanners. This capability may be highly useful to the medical professional to view various features of the anatomy, such as viewing a representation of the patient's skin, bone alone, bone and soft tissue, etc. to assist in surgical planning or provide other information helpful to a procedure. In image 800 of FIG. 8A, the brightness and contrast values are set to 0. In image 810 of FIG. 8B, the brightness and contrast values are set to 0.5. In image 820 of FIG. 8C, the brightness and contrast values are set to 0.15 and 0.25, respectively. In image 830 of FIG. 8D, the brightness and contrast values are set to 0.6 and 0.75, respectively. In one embodiment brightness values may generally range from 0.0 to 0.99 and contrast values may range from 0.0 to 1.0.

Figure 9:
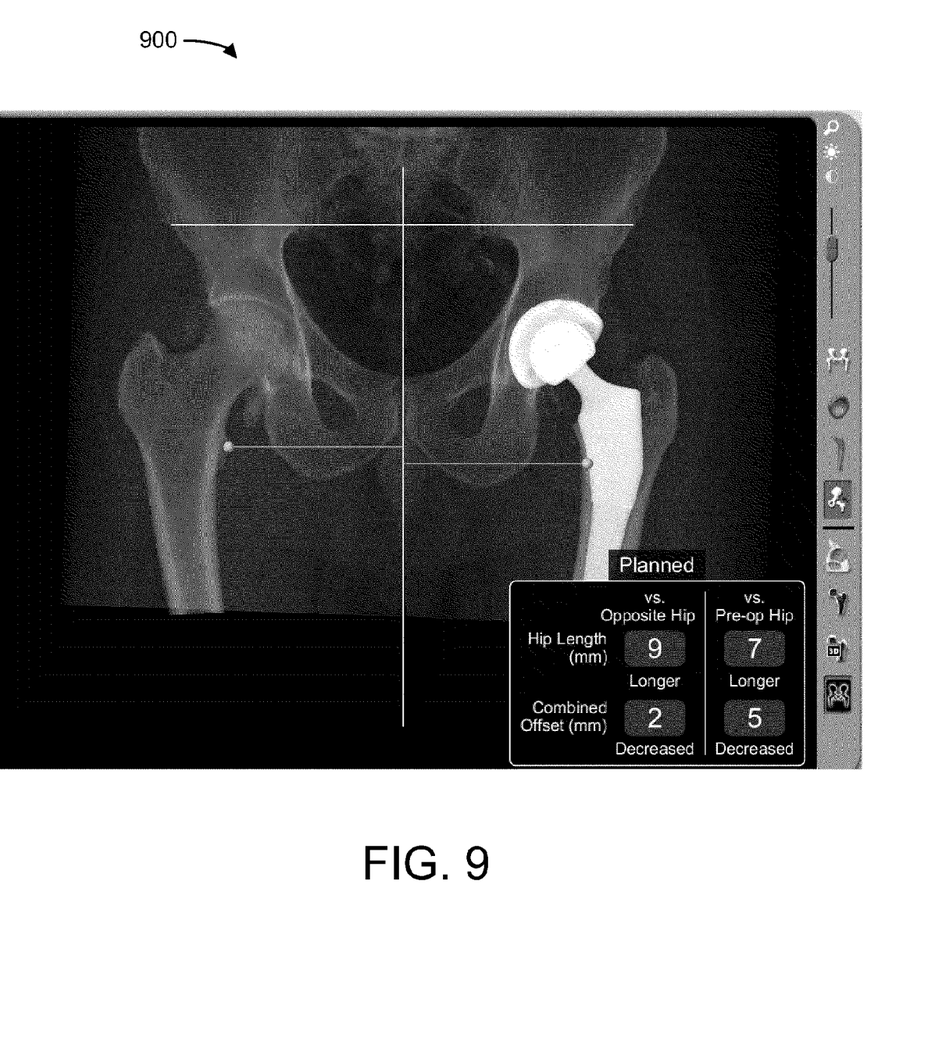
FIG. 9 is an example user interface for which the image generation system may be implemented, according to an exemplary embodiment.

Referring to FIG. 9, a user interface 900 on which an x-ray image may be displayed is shown, according to an exemplary embodiment. User interface 900 may be a user interface displayed to a user as part of a preoperative planning page or mode. User interface 900 may be provided in a separate viewing mode in addition to a 3D view, CT slicer view, and 3D slicer view.

The user may activate the x-ray view when the user toggles on an x-ray view toggle button in the icon toolbar or elsewhere on user interface 900. User interface 900 may include brightness and contrast sliders for adjusting the visual appearance of the image, as described in FIGS. 8A-D. As illustrated in FIG. 9, one slider may be provided with the functionality to toggle between brightness and contrast controls. User interface 900 may further include various controls for supporting an interactive view manipulation, including rotating, panning, or zooming the view of the x-ray image. Use interface 900 may display various lines that indicate various features. For example, in FIG. 9, lines indicating the anterior superior iliac spine (ASIS) and pelvis midline shown in the default orientation are illustrated. The lesser trochanter landmark and hip length indicator lines are also illustrated. Implant positioning is supported, either by clicking the implant positioning buttons or by clicking and dragging the implant model in the cup plan and stem plan modes.

One alternative approach is to use a rasterized representation for the bone and implant models, similarly to a segmentation mask. While the visual quality would not be affected, the extra texture lookups required to use the raster data could result in reduced rendering performance.

Another alternative approach to the x-ray image manipulation is implementing implant visualization and rotation correction by manipulating the data values in the CT volume during segmentation. Such an approach requires moving and calculating large amounts of data, and may be constrained by the resolution of the CT scan.

A third alternative approach may first include computing the accumulated data values along the viewing ray:

$$v_{sum} = \Sigma v(p_k) \quad (26)$$

Next, the accumulated values are normalized to the range of the input data values:

$$v_{norm} = v_{sum}/v_{maxsum} * v_{max} \quad (27)$$

where $v_{maxsum}$ is the maximum of all $v_{sum}$ values computed for the X-ray image and $v_{min}$ is assumed to be zero. The normalization may be helpful to reduce the sensitivity of the computation to the selected step size.

Finally, the normalized accumulated values are mapped to grayscale color according to:

$$c = (\text{clamp}(v_{norm}, v_0, v_1) - v_0)/(v_1 - v_0) \quad (28)$$

where $v_0$ and $v_1$ are computed using equations (13) and (14). Since the brightness and contrast values are only used in equation (25) to control how the normalized accumulated values are mapped to color, the implementation does not need to perform the accumulation step of equation (23) when the user changes the brightness and contrast values in the application.

By creating a two-dimensional x-ray image from data, such as data acquired during a CT scan, and performing a method of x-ray visualization according to the present disclosure, a medical professional may continue to use the x-ray visualization with which he/she is familiar, with added capabilities for manipulating the image to assist in surgical planning and performance.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for generating a virtual radiograph for display on a display device, comprising:
   providing an image generation system having a processing circuit including a processor and a memory device, the image generation system coupled to the display device;
   retrieving three-dimensional image data of an anatomy stored in the memory;
   retrieving a three-dimensional bone model corresponding to a portion of the anatomy stored in the memory;
   associating the three-dimensional bone model with the three-dimensional image data such that the three-dimensional bone model defines first boundary containing a first bounded volume within the three-dimensional image data corresponding to the portion of the anatomy; and
   performing a volume ray casting process on the three-dimensional image data, the process comprising:
   casting a ray from an origin point through a first pixel in a screen space rectangle, and through the first bounded volume;
   sampling the first bounded volume at a plurality of sampling steps along the ray, the sampling steps separated by a sampling distance, wherein the sampling is limited to a segment of the ray between a position proximate to a front facing intersection of the ray and the first boundary, and a position proximate to a back facing intersection of the ray and the first boundary;
   computing an attenuation coefficient of the ray at each of the sampling steps based upon the sample at each of the sampling steps;
   calculating a first accumulated attenuation value of the first bounded volume along the ray;
   casting a second ray along a second pixel of the screen space rectangle;
   repeating the sampling, computing, and calculating steps for the second pixel of the screen space rectangle to calculate a second accumulated attenuation value of the first bounded volume; and
   storing the accumulated attenuation values of the first bounded volume.

2. The method of claim 1, further comprising:
   providing a second boundary defining a second bounded volume of the three-dimensional image data;
   performing the volume ray casting process on the second bounded volume of the three-dimensional image data;
   adding the accumulated attenuation values of the second bounded volume to the virtual radiograph; and
   subtracting the accumulated attenuation values of the first bounded volume from the virtual radiograph.

3. The method of claim 2, further comprising modifying data associated with the first bounded volume.

4. The method of claim 3, wherein the data associated with the first bounded volume includes at least one of three-dimensional image data within the first bounded volume, the attenuation coefficients of the first bounded volume, the accumulated attenuation values of the first bounded volume, and color information associated with the first bounded volume.

5. The method of claim 3, wherein the modification of data associated with the first bounded volume includes at least one of translation, rotation, and resection.

6. The method of claim 3, wherein the modification of data associated with the first bounded volume is performed to correspond to a preoperative plan.

7. The method of claim 3, wherein the data associated with the first bounded volume is the accumulated attenuation values of the first bounded volume, and further comprising adding the modified accumulated attenuation values of the first bounded volume to the virtual radiograph.

8. The method of claim 1, further comprising:
   calculating attenuation values of an implant model; and
   adding the attenuation values of the implant model to the virtual radiograph.

9. The method of claim 8, wherein the implant model is positioned relative to the three dimensional image data according to a preoperative plan.

10. The method of claim 1, further comprising converting the accumulated attenuation values of the first bounded volume to color information and providing the color information to the display.

* * * * *